(12) United States Patent
Carr

(10) Patent No.: US 12,329,347 B2
(45) Date of Patent: Jun. 17, 2025

(54) COMBINATION DRYING MAT, RACK AND STORAGE CONTAINER

(71) Applicant: Umbra LLC, Buffalo, NY (US)

(72) Inventor: Matthew J. Carr, Toronto (CA)

(73) Assignee: Umbra LLC, Buffalo, NY (US)

( * ) Notice: Subject to any disclaimer, the term of this patent is extended or adjusted under 35 U.S.C. 154(b) by 0 days.

(21) Appl. No.: 18/456,033

(22) Filed: Aug. 25, 2023

(65) Prior Publication Data

US 2025/0064293 A1 Feb. 27, 2025

(51) Int. Cl.
*A47L 19/04* (2006.01)
*A47J 47/16* (2006.01)
*A47L 19/02* (2006.01)

(52) U.S. Cl.
CPC ............... *A47L 19/04* (2013.01); *A47J 47/16* (2013.01); *A47L 19/02* (2013.01)

(58) Field of Classification Search
CPC ........ A47L 15/505; A47L 19/00; A47L 19/02; A47L 19/04; A47J 47/16
See application file for complete search history.

(56) References Cited

U.S. PATENT DOCUMENTS

| | | | | |
|---|---|---|---|---|
| 4,527,707 A * | 7/1985 | Heymann | ............. | A47L 15/501 211/74 |
| 5,620,622 A * | 4/1997 | Lang | ............. | A47L 19/04 219/400 |
| 6,170,676 B1 * | 1/2001 | Patadia | ............. | A47L 19/04 211/41.6 |
| 6,516,956 B2 * | 2/2003 | Martorella | ............. | A47L 19/04 211/41.6 |
| 6,640,982 B1 * | 11/2003 | Bjerke | ............. | F26B 25/18 211/85.15 |
| 7,344,036 B2 * | 3/2008 | Jerstroem | ............. | A47L 19/04 211/41.6 |
| 8,573,410 B2 * | 11/2013 | Chalifoux | ............. | A47L 19/02 211/41.5 |
| 8,960,452 B2 * | 2/2015 | Rhodes, II | ............. | A47L 19/04 211/41.6 |
| D732,256 S * | 6/2015 | Huang | ............. | D32/55 |
| 9,107,552 B2 * | 8/2015 | Micek | ............. | A47L 19/04 |
| D773,142 S * | 11/2016 | Green | ............. | A47L 19/00 D32/55 |
| D774,719 S * | 12/2016 | Green | ............. | D32/55 |

(Continued)

FOREIGN PATENT DOCUMENTS

EP 0411187 A1 * 8/1989 ............. A47J 47/16

*Primary Examiner* — Patrick D Hawn
(74) *Attorney, Agent, or Firm* — Simpson & Simpson, PLLC

(57) ABSTRACT

A combination drying mat, rack and storage container having a mat having a raised attachment wall extending therefrom, a container having an outer wall arranged to removably accept the raised attachment wall therein, and a rack pivotably secured to the container and arranged to move between a first position wherein the rack is resting upon the mat and a second position wherein the rack is tucked at least partially into an area within the container. In some arrangements, the combination drying mat, rack and storage container may further include a flexible and expandable band pivotably attached to the container, wherein the band is arranged to pivot and substantially secure the rack in the second position.

21 Claims, 11 Drawing Sheets

(56) References Cited

U.S. PATENT DOCUMENTS

| | | | |
|---|---|---|---|
| 9,669,140 B2 * | 6/2017 | Paradise | A61M 1/062 |
| 9,730,571 B1 * | 8/2017 | Lee | A47L 19/04 |
| 9,907,453 B2 | 3/2018 | Green | |
| D814,730 S * | 4/2018 | Cooper | D32/55 |
| D830,657 S * | 10/2018 | Green | D32/55 |
| 10,271,710 B2 * | 4/2019 | Wegner | A47L 15/506 |
| D882,899 S * | 4/2020 | Evans | D32/55 |
| 10,631,711 B2 * | 4/2020 | Dunn | A47L 19/02 |
| 10,716,452 B2 * | 7/2020 | Sauceda | A46B 17/02 |
| D897,063 S | 9/2020 | Green et al. | |
| D916,412 S * | 4/2021 | Moody Fear | D32/55 |
| 11,103,121 B1 * | 8/2021 | Wood | A47L 19/04 |
| D961,879 S * | 8/2022 | Stevens | D32/55 |
| D970,842 S * | 11/2022 | Mao | D32/55 |
| D1,008,596 S * | 12/2023 | Asis | D32/55 |
| 11,832,777 B2 * | 12/2023 | Klug | A47L 19/02 |
| D1,013,312 S * | 1/2024 | Zhou | D32/58 |
| 2005/0145583 A1 * | 7/2005 | Martorella | A47L 19/04 211/41.6 |
| 2008/0149644 A1 * | 6/2008 | Piacenza | A47L 19/04 220/571 |
| 2008/0263762 A1 * | 10/2008 | Burns | E03C 1/186 4/657 |
| 2008/0283480 A1 * | 11/2008 | Segall | A47L 19/04 211/41.6 |
| 2012/0138550 A1 * | 6/2012 | Wisniewski | A47L 19/04 211/41.3 |
| 2017/0231465 A1 * | 8/2017 | Wilmsen | A47L 19/00 34/95 |

* cited by examiner

COMBINATION DRYING MAT, RACK AND STORAGE CONTAINER

The present invention relates to a combination drying mat, rack and storage container.

BACKGROUND

Dish drying racks are well known articles of manufacture, which provide an area to dry and store various types of kitchenware, such as plates, bowls, glasses, utensils, etc. Generally, a dish drying rack includes a base and a plurality of drainage slots arranged to hold and dry kitchenware. Similarly, dish drying rack usually are placed on a dish drying mat which provides an area to dry and store various types of kitchenware. Over the years, many devices have been developed to make the process of cleaning and drying dishes more efficient. Automatic, electric dishwasher appliances are well known, but expensive, and not affordable by everyone. Therefore, there is a continuing need for improved devices and methods for the manual washing and drying of dishes, flatware, cookware, and the like.

After being washed, dishes are usually placed in a drying rack on a countertop adjacent to a sink to expedite the air-drying process. A problem with prior dish drying racks is that some require the use of a towel underneath the rack to prevent water runoff from accumulating on the counter and subsequent spilling over onto the floor. An example of a dish drying rack which solves the aforementioned problem is disclosed in U.S. Pat. No. 9,907,453, filed Dec. 22, 2015, which patent is incorporated by reference herein in its entirety.

Many versions of dish drying racks include containers arranged for holding utensils. These containers typically include drainage apertures arranged within a floor of the container to allow the water to exit the container. An example of this type of container is illustrated in U.S. Design Pat. No. D897,063, filed Apr. 16, 2019.

Thus, there is a long-felt need for a combination drying mat, rack and storage container where the drying rack is arranged to be substantially collapsed within the container and also secured at least partially within the container, where the rack and container combination is arranged to be removably seated on a drying mat, wherein the mat may be collapsed and secured substantially proximate the container.

SUMMARY

Generally, the present invention comprises a combination drying mat, rack and storage container, where the rack and storage container are arranged to be removably engaged to the mat, the container having a pivotably secured rack attached thereto and a pivotably attached flexible band attached thereto, where the rack is arranged to be moved and/or pivoted at least partially within the container, where the band is arranged to pivot and substantially secure the rack at least partially within the container, and wherein the mat may be folded and substantially secured proximate the container via the band—allowing the aforementioned present invention to be configured in either an expanded or collapsed arrangement. By providing a pivoting flexible band, foldable mat, and a pivoting rack, the assembly may be collapsed for transport or to accommodate easy cleaning of a counter top proximate or underneath the device.

According to aspects illustrated herein, there is provided a combination drying mat, rack and storage container, having a mat having a raised attachment wall extending therefrom, a container having an outer wall arranged to removably accept the raised attachment wall therein, and a rack pivotably secured to the container and arranged to move between a first position wherein the rack is resting upon the mat and a second position wherein the rack is tucked at least partially into an area within the container.

In some arrangements, the aforementioned combination drying mat, rack and storage container may further include a flexible band pivotably attached to the container, wherein the band is arranged to pivot and substantially secure the rack in the second position. In a first position the flexible band tightly contacts an outer wall of the container, whereas in a second position it may be stretched to create a space between the band and the outer wall of the container.

In further arrangements the aforementioned mat of the combination drying mat, rack and storage container is arranged to move between a first position wherein the mat is extending away from the container and a second position wherein the mat is folded proximate the rack when the rack is in the first position of the rack, where the aforementioned band may be arranged to pivot and substantially secure the mat in the second position of the mat.

In other embodiments and according to aspects illustrated herein, there is provided a combination drying mat, rack and storage container comprising a container having an outer wall, a rack pivotably secured to the container and arranged to move between a first position wherein the rack is resting upon the mat and a second position wherein the rack is tucked at least partially into an area within the container, and a flexible band pivotably attached to the container, wherein the band is arranged to pivot and substantially secure the rack in the second position.

In some embodiments, the aforementioned combination drying mat, rack and storage container further includes a mat having a raised attachment wall extending therefrom, wherein the outer wall of the container is arranged to removably accept the raised attachment wall therein.

In further embodiments, the aforementioned mat of the combination drying mat, rack and storage container is arranged to move between a first position wherein the mat is extending away from the container and a second position wherein the mat is folded proximate the rack when the rack is in the first position of the rack, where the band may be further arranged to pivot and substantially secure the mat in the second position of the mat.

In some configurations and according to aspects illustrated herein, there is provided a combination drying mat, rack and storage container comprising a mat having a raised attachment wall extending therefrom, a container having an outer wall arranged to removably accept the raised attachment wall therein, a rack pivotably secured to the container and arranged to move between a first position wherein the rack is resting upon the mat and a second position wherein the rack is tucked at least partially into an area within the container, and a flexible band pivotably attached to the container, wherein the band is arranged to pivot and substantially secure the rack in the second position.

As such, a general object of the present invention is to provide a combination drying mat, rack and storage container that may be arranged in an expanded configuration for use and a collapsed configuration for: storage, transport, and/or shipping.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1A:
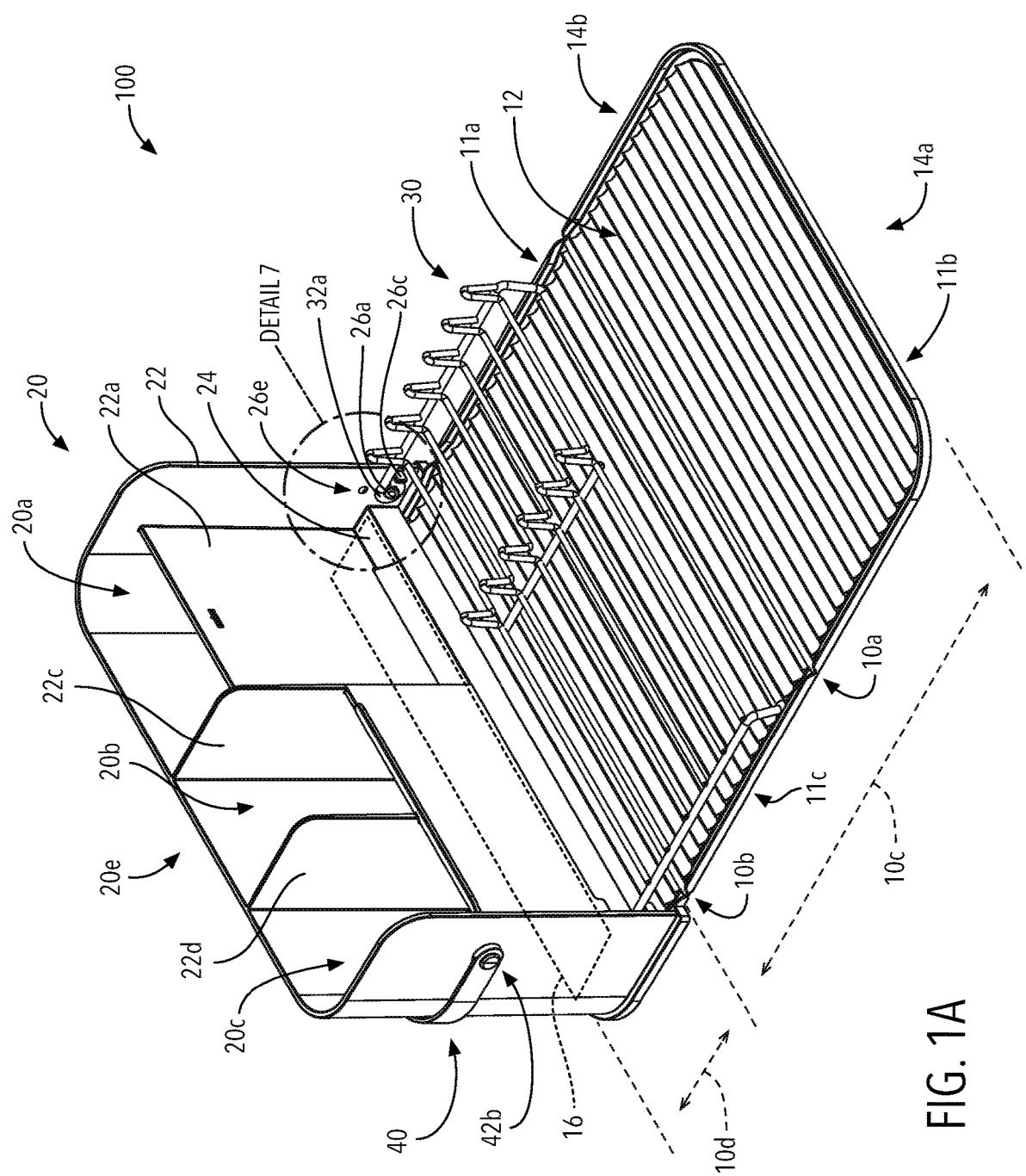
FIG. 1A is a left-side perspective view of the present invention in an open configuration.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims. Those in the art will understand that any suitable material, now known, or hereafter developed, may be used in forming the present invention described herein.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be noted that the terms "including", "includes", "having", "has", "contains", and/or "containing", should be interpreted as being substantially synonymous with the terms "comprising" and/or "comprises".

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" or "one of:" is used herein.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

The terms "distal" or "distally" are intended to be exemplary directional terms and should be interpreted to mean that a first component is arranged away from a second component. Likewise, the terms "proximal" or "proximally" are intended to be exemplary directional terms and should be interpreted to mean that a first component is arranged close to a second component.

Figure 1B:
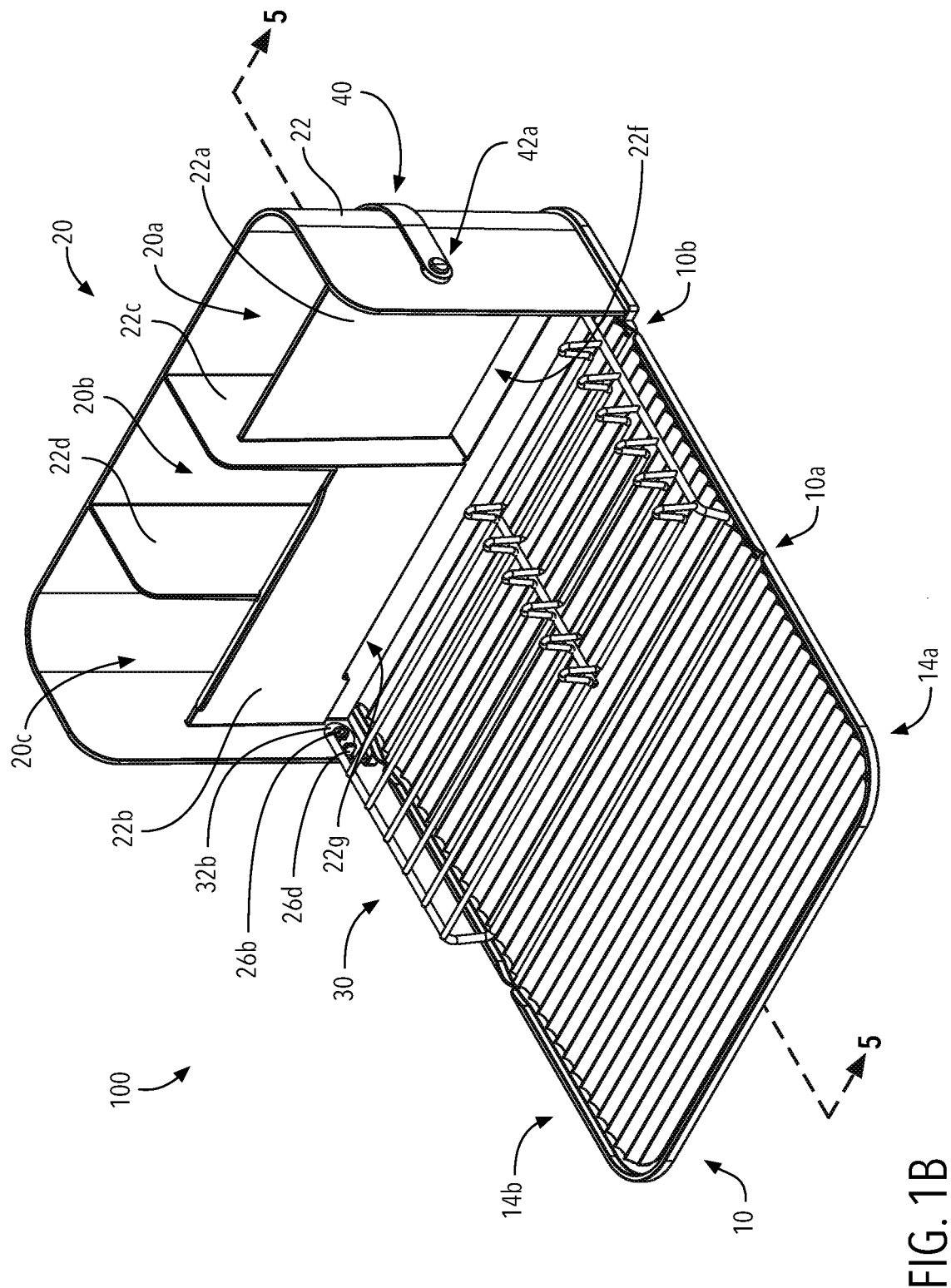
FIG. 1B is a right-side perspective view of the invention shown in FIG. 1A.
Figure 2:
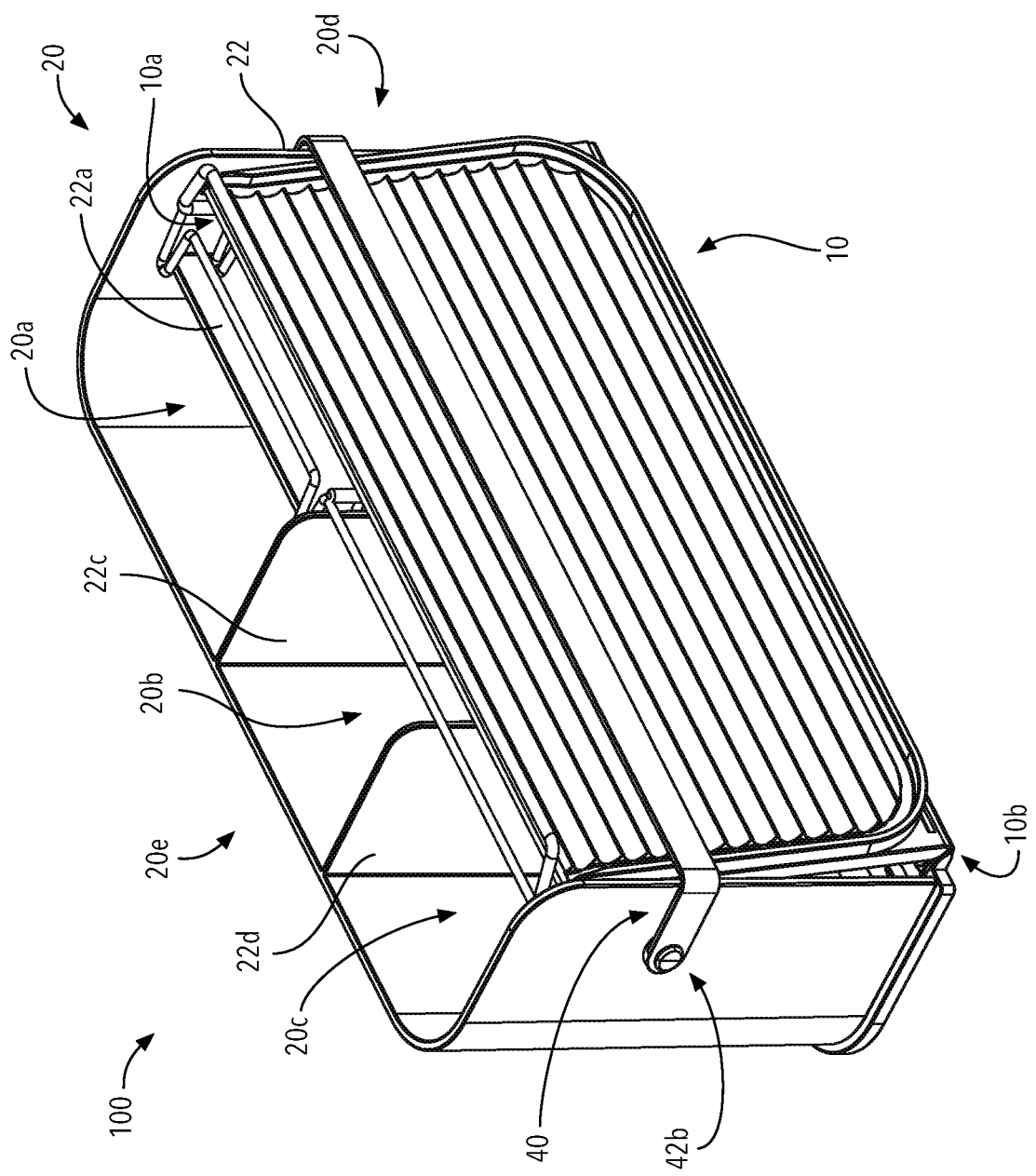
FIG. 2 is a perspective view of the invention shown in FIG. 1A in a closed configuration.

Adverting now to the figures, the following description should be taken in view of FIGS. 1A through 2, which generally illustrate perspective views of the present invention in an open, or expanded, configuration, and a perspective view of the present invention in a closed, or collapsed, configuration. Generally, the present invention is a combination drying mat, rack and storage container, hereinafter "combination assembly 100". In a preferred embodiment, combination assembly 100 includes mat 10, container 20, rack 30, and band 40, where container 20 is frictionally and removably secured to mat 10, rack 30 is at least pivotably secured to container 20, and band 40 is at least pivotably secured to container 20. Thus, rack 30 and band 40 are movably attached to container 20.

In some arrangements, mat 10 has bottom surface 14a and top surface 14b, where plurality of ridges 12 extend outwardly from top surface 14b. Mat 10 includes first seam 10a and second seam 10b, which define folding points of mat 10, thereby allowing mat 10 to fold into the collapsed configuration of combination assembly 100 shown in FIG. 2. As shown in the figure, the two seams are parallel to, and spaced apart from one another. They also traverse the width of the mat parallel to edge 11b and perpendicular to edges 11a and 11c. Mat 10 generally has two sections, drying portion 10c and attachment portion 10d. In a preferred embodiment, seams 10a and 10b are arranged on drying portion 10c. Container 20 is arranged to frictionally and removably secure to attachment portion 10d of mat 10, discussed further, infra. Specifically, attachment wall 16 (generally illustrated by hidden lines in FIG. 1A), which extends upwardly from top surface 14b of attachment portion 10d of mat 10 provides structure to removably and frictionally secure container 20 to the mat. Preferably, mat 10 is made of a substantially flexible material, or rubber-like material, e.g., silicone, however, those in the art will understand that any suitable material, now known or hereafter developed, may be used in forming mat 10.

In some embodiments, container 20 of combination assembly 100 may comprise outer wall 22, floor 24, and partitions 22a through 22d, which are connected to at least one of outer wall 22 and floor 24. First partition 22a and second partition 22b are at least partially connected to floor 24, thereby forming slots 22f and 22g, respectively. First slot 22f and second slot 22g are essentially drainage apertures. It should be appreciated that a different number and shape of drainage slots/apertures could be used, i.e., slot 22f and/or slot 22g could have multiple "sub-slots" therein. Thus, floor 24 could also have a plurality of drainage apertures arranged therein. Container 20 may be configured to have at least one internal compartment, e.g., internal compartments 20a through 20c. In a preferred embodiment, container 20 includes three internal compartments, first internal compartment 20a, second internal compartment 20b, and third internal compartment 20c. First internal compartment 20a is formed by outer wall 22, floor 24, first partition 22a and third partition 22c, such that first internal compartment 20a has five (5) substantially closed walls defining an internal space and an open end arranged distally in relation to floor 24. Second internal compartment 20b is formed by outer wall 22, floor 24, second partition 22b, third partition 22c, and fourth partition 22d, that second internal compartment 20b has five (5) substantially closed walls defining an internal space and an open end arranged distally in relation to floor 24. Third internal compartment 20c is formed by outer wall 22, floor 24, second partition 22b, and fourth partition 22d, that third internal compartment 20c has five (5) substantially closed walls defining an internal space and an open end arranged distally in relation to floor 24. In a preferred embodiment, first slot 24f is in communication with first internal compartment 20a and second slot 24g is in communication with second internal compartment 20b and third internal compartment 20c. Obviously, the container could have a different number of internal compartments of various shapes and dimensions.

In a preferred arrangement, rack 30 and band 40 are pivotably connected to container 20. In one possible arrangement, first protrusion 26a and second protrusion 20b extend from an inner surface of outer wall 22. First protrusion 26a and second protrusion 20b arranged to engage "looped ends" of rack 30 (discussed further, infra), such that the respective looped ends of rack 30 may rotate/pivot about protrusions 20a and 20b. In other embodiments, third protrusion 26c and fourth protrusion 26d extend from the inner surface of outer wall 22 and arranged distally in relation to first and second protrusions 26a and 26b, respectively (i.e., protrusions 26c and 26d are arranged farther away from first partition 22a and second partition 22b than first protrusion 26a and second protrusion 20b). Third protrusion 26c and fourth protrusion 26d are arranged to act as rotation-limiting members, such that when rack 30 is pivoted in an expanded configuration (as shown in FIGS. 1A and 1B), rack 30 rests on third protrusion 26c and fourth protrusion 26d. Container 20 may also include fifth protrusion 26e, which extends from an inner surface of outer wall 22 and may take a dome-like configuration. Fifth protrusion 26e may also be referred to as a "locking protrusion", discussed further, infra.

In some embodiments, first outer protrusion 42a and second outer protrusion 42b extend from an outer surface of outer wall 22 of container 20. Band 40 is pivotably secured, proximate respective ends, to first outer protrusion 42a and second outer protrusion 42b, respectively. First outer protrusion 42a and second outer protrusion 42b may each include two portions, a first portion which extends from outer wall 22 and having a first diameter, and a second portion extending from the first portion having a second diameter, where the second diameter is greater than the first diameter. Preferably, band 40 is arranged on the respective first portions of first outer protrusion 42a and second outer protrusion 42b, and substantially held thereon via the respective second portions of first outer protrusion 42a and second outer protrusion 42b. In a preferred embodiment, band 40 is flexible and expandable, such that it may be stretched when a force is imparted thereon and recoils to its original length/size when the force is removed. That is, in a first state it is contracted and in contact with the outer wall of the container, but in a second state it can be expanded to create a space between the inner surface of the band and the outer surface of the container, and, in this expanded state, it can actually pivot/rotate in an arc completely above the top of the container, into a new position which accommodate holding the folded mat and rack in place partially within the container. As such, band 40 may be comprised of a rubber-like material, or like-alternatives, as those in the art will understand that any suitable material, now known or hereafter developed, may be used in forming band 40.

Combination assembly 100, discussed supra, may be configured in an expanded position, as shown in FIGS. 1A and 1B, or in a collapsed position, as shown in FIG. 2. Wall 22 is configured to substantially form three (3) closed ends (generally indicated by 20e) and one open end, open end 20d. Rack 30 and mat 10 may be pivotably and/or foldably stored, at least partially within open end 20d of container 20. Rack 30 is substantially locked, at least partially within open end 20d via fifth protrusion 26e. Rack 30 may alternative be held, at least partially within open end 20d by band 40 being pivoted from closed end 20e to proximate open end 20d, thereby sandwiching rack 30 between at least one of first partition 22a and/or second partition 22b, and band 40. mat 10 is substantially held, at least partially within open end 20d of container 20, by band 40 being pivoted from closed end 20e to proximate open end 20d, thereby sandwiching mat 10 between band 40 and rack 30. When mat 10 is at least partially within open end 22d, mat 10 is folded at seams 10a and 10b.

Figure 3:
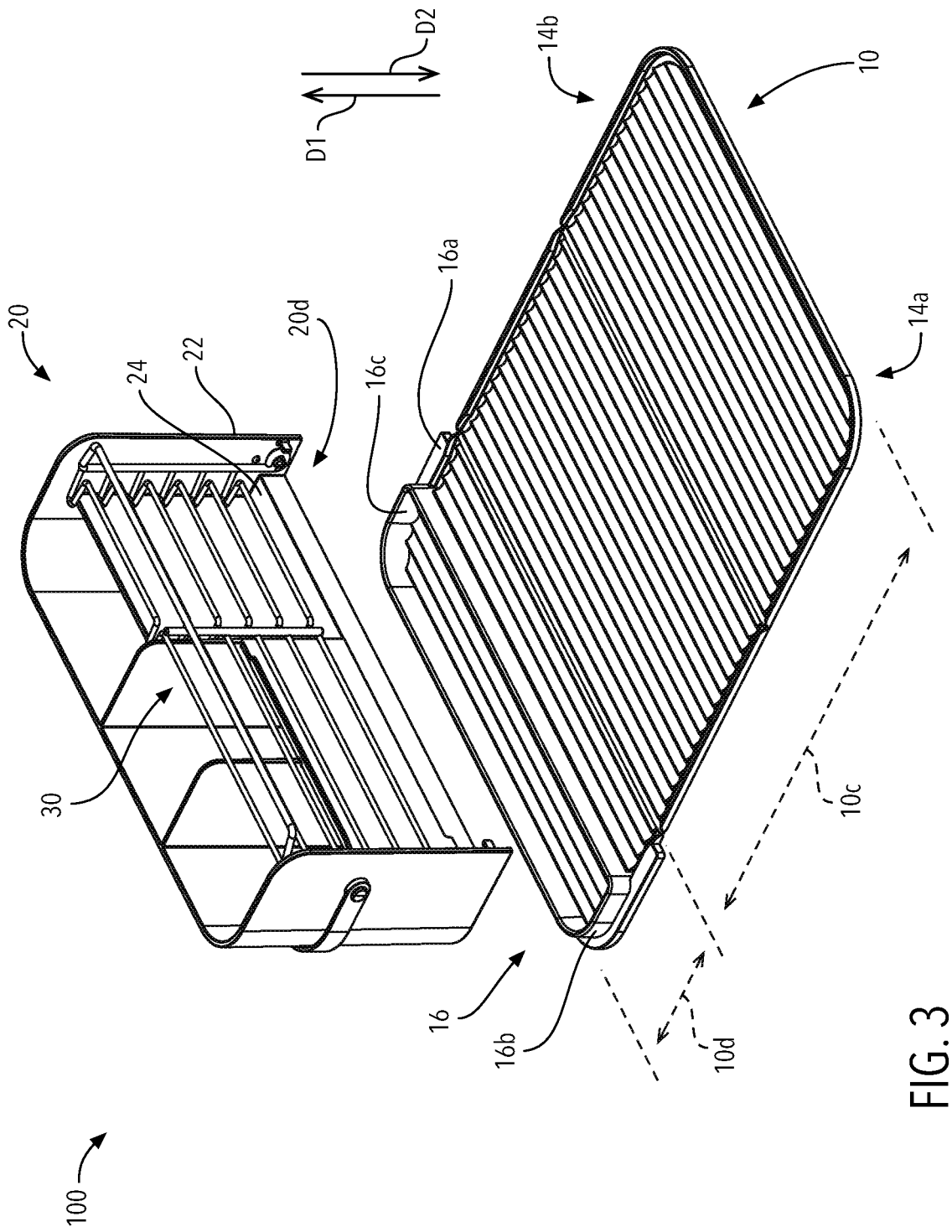
FIG. 3 is a partially exploded view of the invention shown in FIG. 1A.
Figure 4:
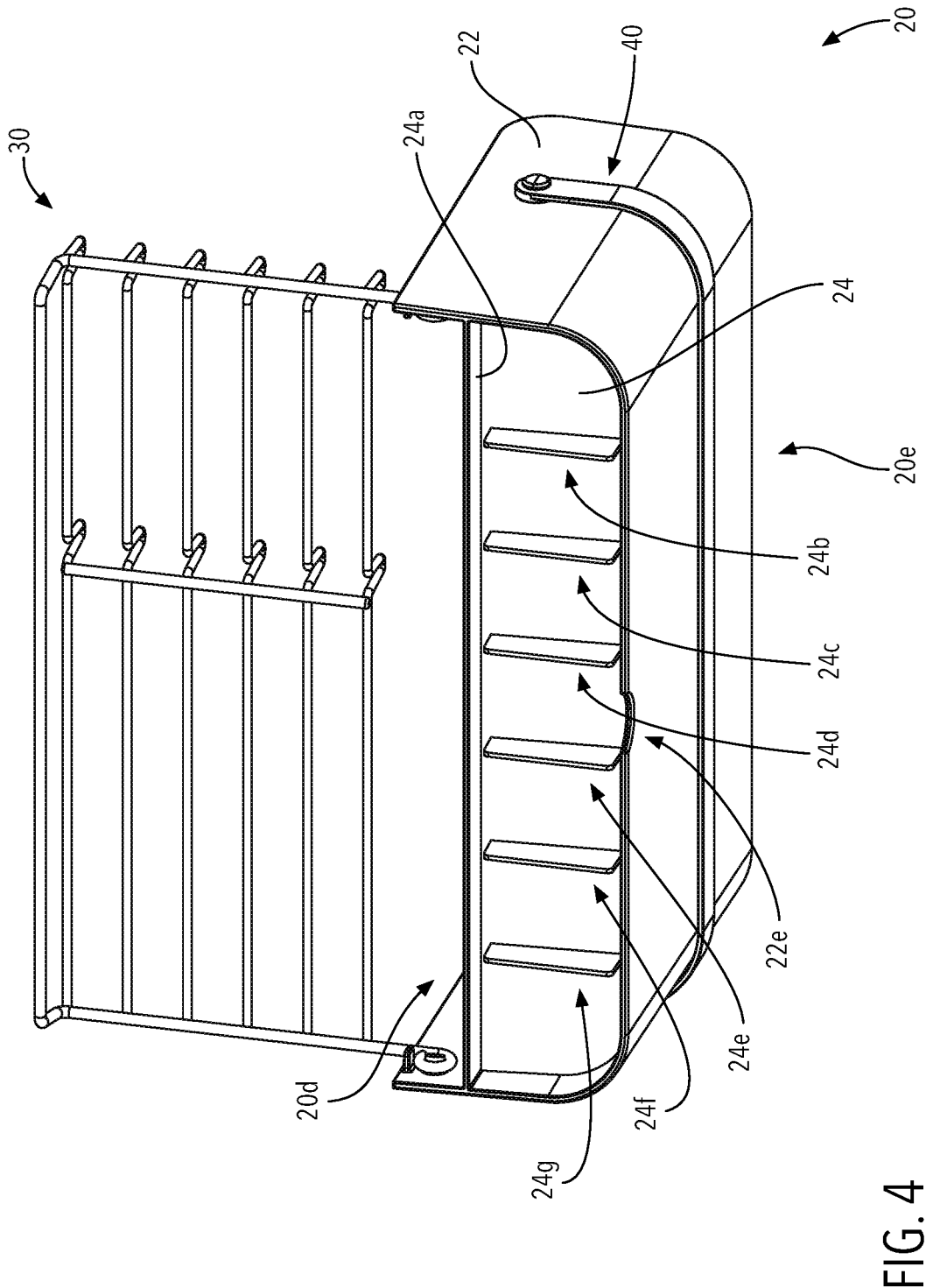
FIG. 4 is a bottom perspective view of the container of the invention shown in FIG. 1A.

The following description should be taken in view of the aforementioned figures and FIGS. 3 through 4. FIG. 3 generally illustrates container 20 removed from mat 10 and where rack 30 is arranged at least partially within open end 20d of container 20. Attachment portion 10d of mat 10 includes lip 16a which is arranged to extend beyond an external perimeter of drying portion 10c. Attachment wall 16 extends upwardly, in direction D1, from lip 16a, and preferably forms a continuous wall, defining space 16d therein. Attachment wall 16 includes outer surface 16b and internal surface 16c and has a first distance therebetween, i.e., a first width.

When viewing container 20 from below (removed from mat 10), as shown in FIG. 4, container 20 also includes floor 24, connected to outer wall 22. Floor 24 includes floor wall 24a connected to outer wall 22 and floor 24. Extending from floor 24 are a plurality of attachment fins, attachment fins 24b through 24g, each of which includes a first space (28a in FIG. 6) between outer wall 22 and a second space (28b in FIG. 6) between floor wall 24a, where all of the spaces have a second distance therebetween, i.e., a second width, and the second distance is preferably slightly less then the first distance between outer surface 16b and internal surface 16c of attachment wall 16 of mat 10.

Figure 5:
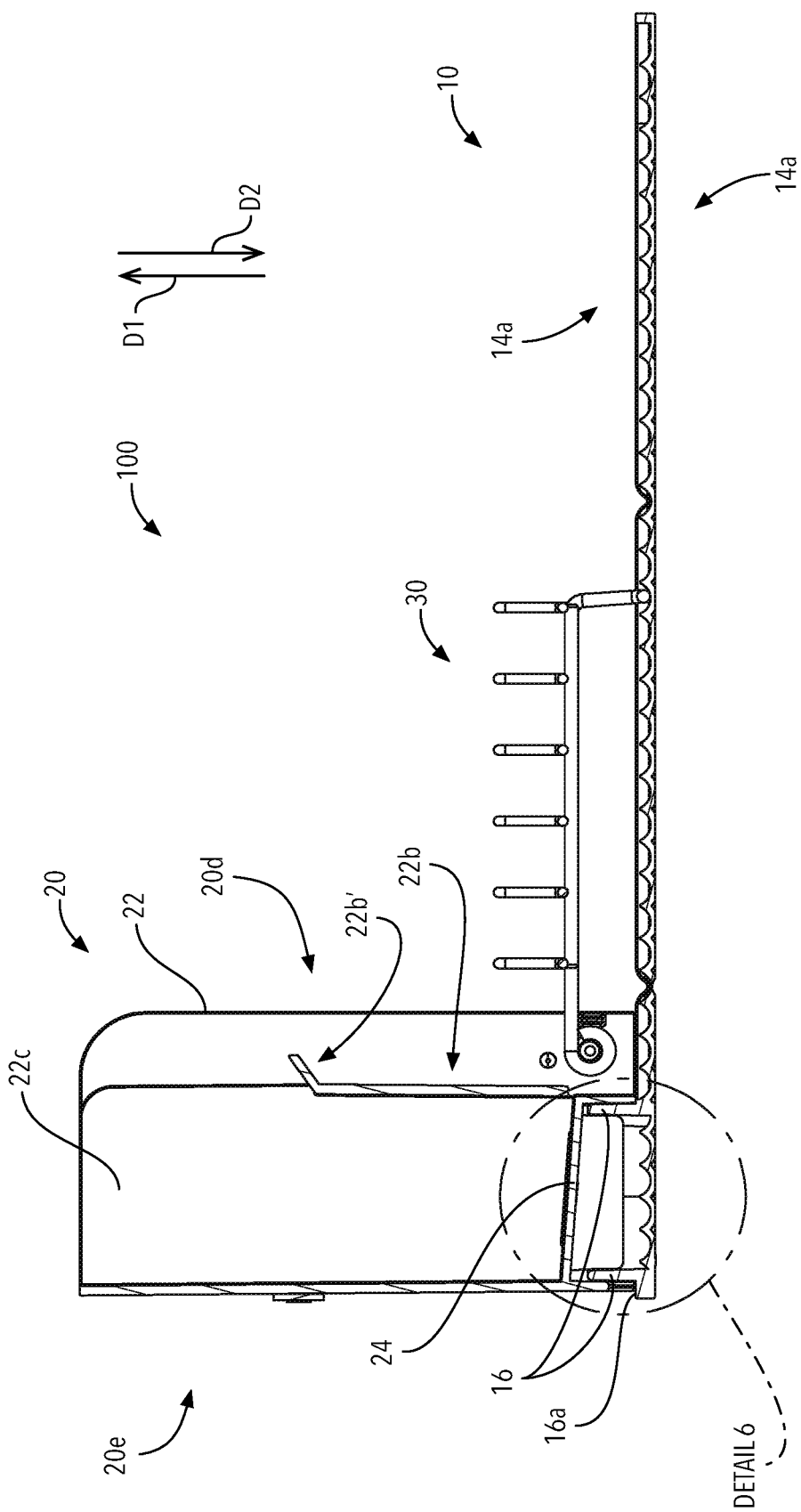
FIG. 5 is a cross-sectional view taken generally along line 5-5 in FIG. 1B.
Figure 6:
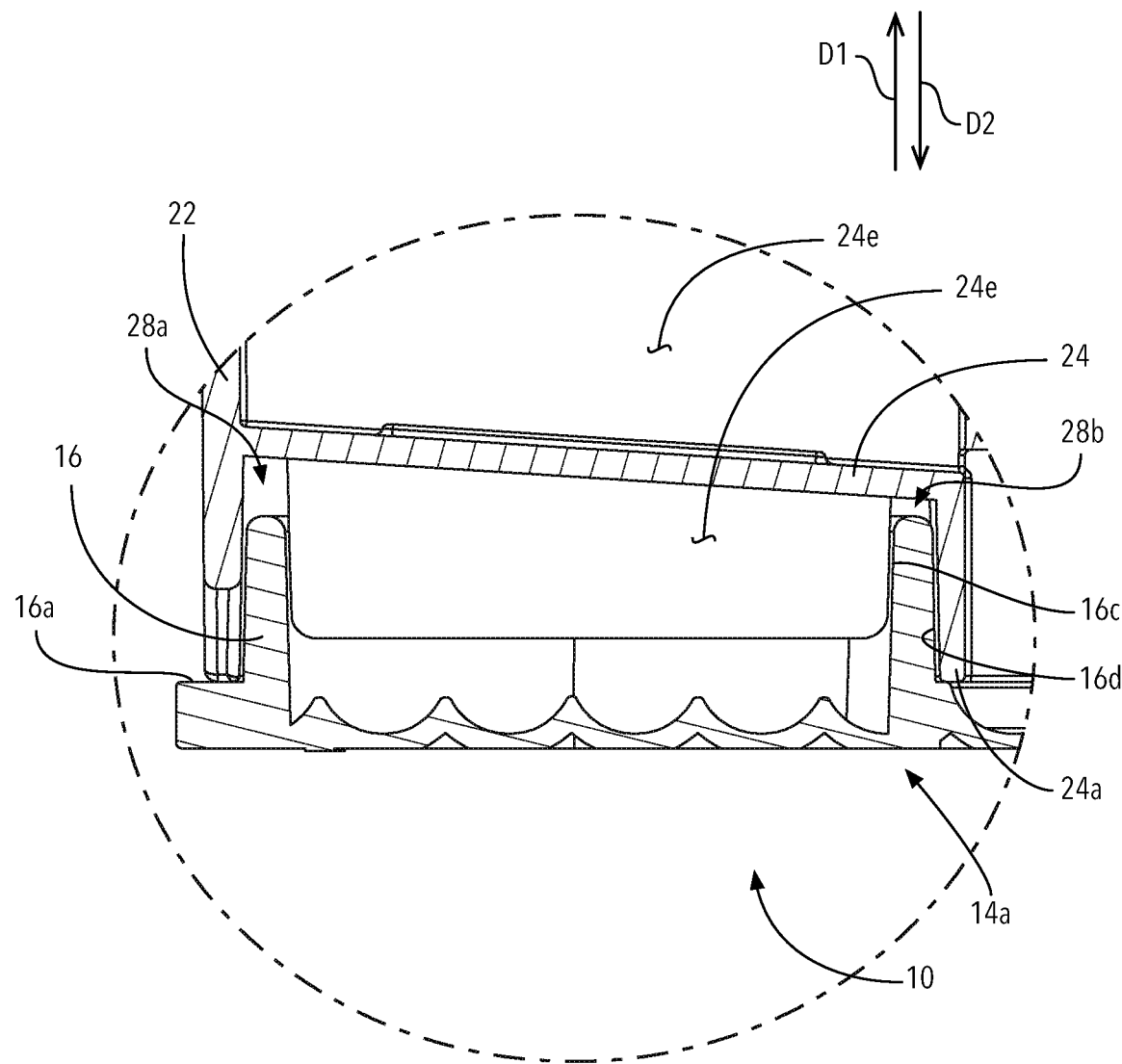
FIG. 6 is an enlarged view taken generally from DETAIL 6 in FIG. 5.

The following description is primarily illustrated in FIGS. 5 and 6 and also should be taken in consideration of the aforementioned figures. Container 20 and mat 10 are frictionally and removably attached when combination assembly 100 is assembled. FIGS. 5 and 6, show a cross-sectional view of combination assembly taken generally from line 6-6 in FIG. 1B, and enlarged view taken from DETAIL 6 in FIG. 5. As shown in FIGS. 5 and 6, the frictionally and removable securement of container 20 and mat 10 is between attachment wall 16 and floor 24, specifically attachment fins 24b-24g, outer wall 22, and floor wall 24a, which create spaces 28a and 28b (proximate each of fins 24b-24g). Attachment wall 16 is frictionally secured within spaces 28a and 28b (proximate each of fins 24b-24g). Spaces 28a and 28b are each the second width, such that the first width of attachment wall 16 requires force to engage or disengage container 20 and mat 10.

In a preferred embodiment, shown in FIG. 6, floor 24 has a slope in direction D2 towards open end 20d (shown in FIG. 5) of container 20 (shown in FIG. 5), such that fluid may drain from floor 24 and through at least one of slots 22f and 22g (shown in FIG. 1B).

Figure 7:
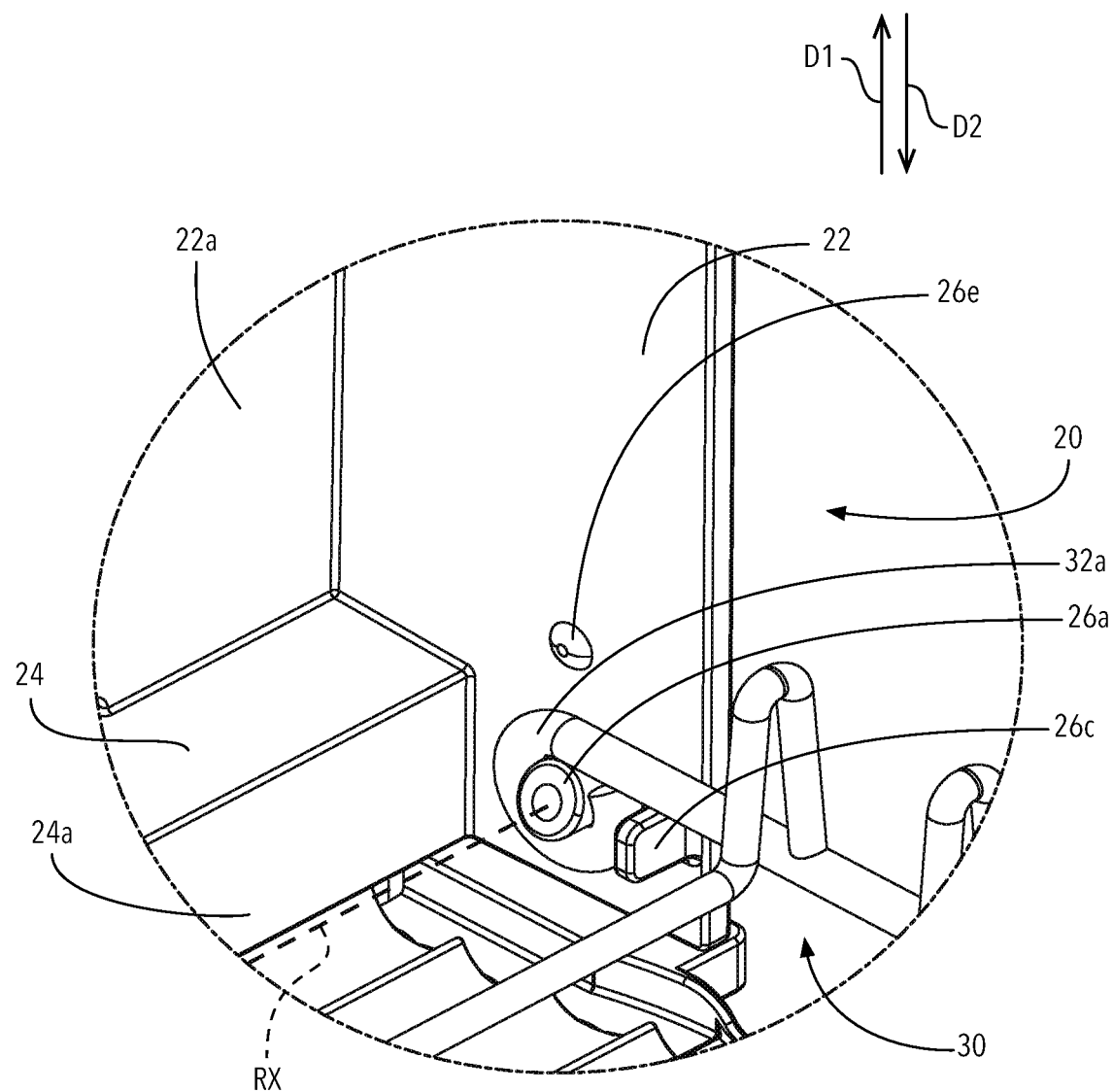
FIG. 7 is an enlarged view taken generally from DETAIL 7 in FIG. 1A.
Figure 8:
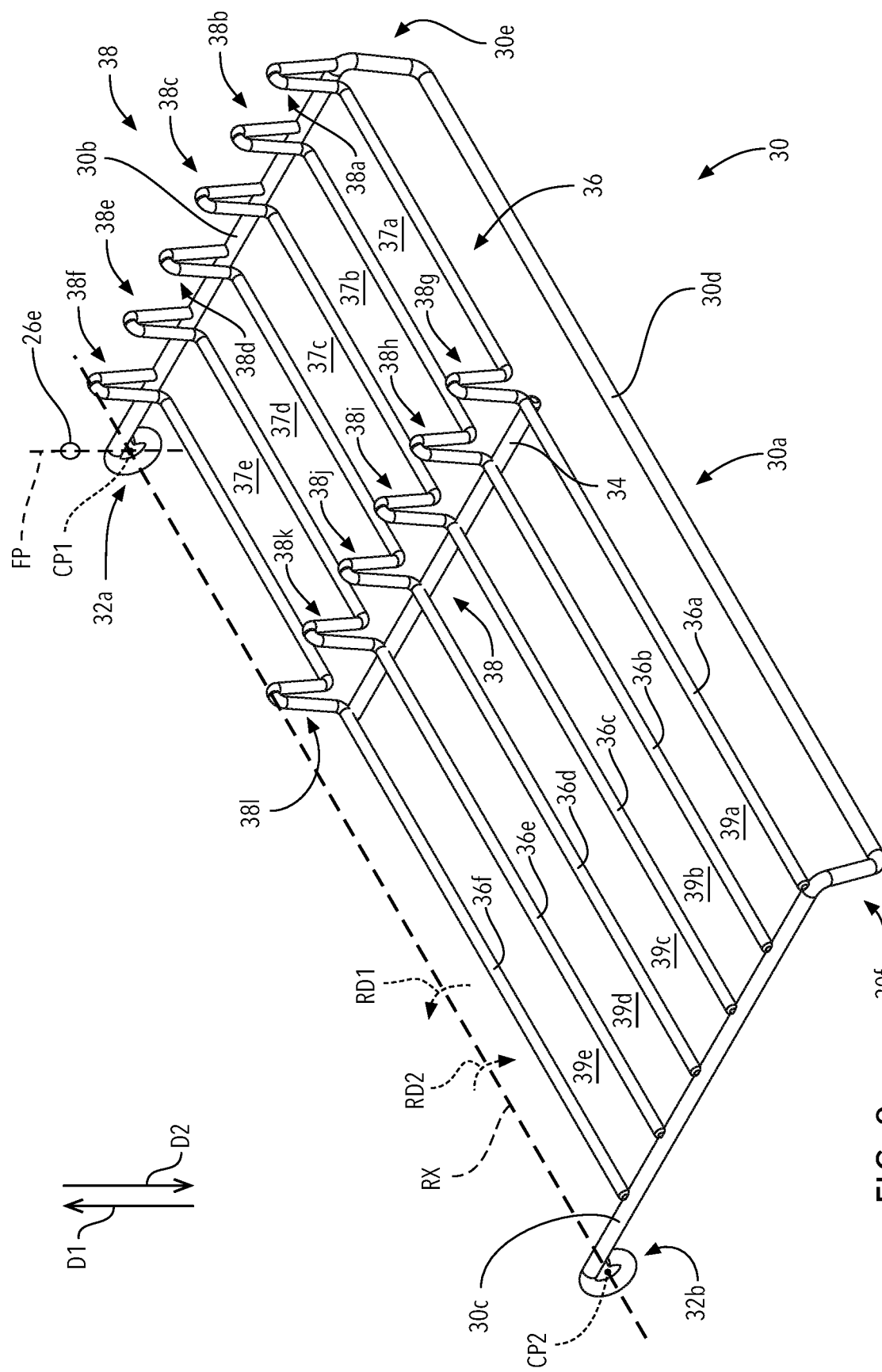
FIG. 8 is a perspective view of the rack of the invention shown in FIG. 1A.

The following description should be taken in view of the aforementioned figures and specifically FIGS. 7 and 8. FIG. 7 illustrates an enlarged view taken from DETAIL 7 in FIG. 1A and FIG. 8 illustrates a perspective view of rack 30 removed from container 20.

In a preferred embodiment, rack 30 includes U-shaped frame 30a, first loop 32a and second loop 32b arranged at respective ends of U-shaped frame 30a, plurality of transverse members 36, and connecting member 34, where plurality of transverse members 36 and connecting member 34 collectively form a first plurality of slots comprising slots 37a-37e and second plurality of slots comprising slots 39a-39e. Slots 37a-37e and 39a-39e are spaces between transverse members 36a-36f, connecting member 34 and at least one of longitudinal members 30b and 30c. e.g., slot 37a is defined by the space between transverse members 36a and 36b, connecting member 34 and first longitudinal member 30b, slot 39a is slot 37a is defined by the space between transverse members 36a and 36b, connecting member 34 and second longitudinal member 30c. U-shaped frame 30a may include first longitudinal member 30b having first loop 32a disposed at a first end and first bend 30e disposed at a second end, and second longitudinal member 30c having second loop 32b disposed at a first end and second bend 30f disposed at a second end. First bend 30e and second bend 30f are connected to cross member 30d. Plurality of transverse members includes transverse members 36a-36f, where each of transverse members 36a-36f includes a first end connected to first longitudinal member 30b and a second end connected to second longitudinal member 30c. Preferably, each of transverse members 36a-36f are equally spaced in parallel fashion with respect to an adjacent transverse member. Connecting member 34 is connected to transverse members 36a-36f and is preferably arranged proximate first longitudinal member 30b. Connecting member 34 bifurcates transverse members 36a-36f, thereby forming first plurality of slots between transverse members 36a-36f and bounded by connecting member 34 and first longitudinal member 30b, and forming second plurality of slots between transverse members 36a-36f and bounded by connecting member 34 and second longitudinal member 30c, where the first plurality of slots (e.g., slots 37a-37e) are shorter than the second plurality of slots (e.g., slots 39a-39e), i.e., the length of either plurality of slots is determined by where connecting member 34 is connected to the plurality of transverse members 36a-36f. Each of transverse members 36a-36f includes a pair of protruding bends arranged therein, e.g., transverse member 36a include protruding bends 38a and 38g, transverse member 36b includes protruding bends 38b and 38h, etc. Protruding bends 38a through 38l (collectively plurality of protruding bends 38) may take a variety of forms and/or sizes, and the accompanying drawings are intended to be exemplary of one of various embodiments within the scope of the appending claims.

In reference to rack 30 and as best illustrated in FIG. 8, there are preferred, but not exclusive, arrangements of transverse members 36a-36f. In a preferred embodiment, transverse members 36a-36f are arranged parallel to and spaced apart from one another, and, preferably, equally spaced apart. Transverse members 36a-36f are also arranged parallel to cross member 30d and perpendicular to first longitudinal member 30b, second longitudinal member 30c, and connecting member 34.

Preferably, rack 30 is comprised of a tubular and rigid material, e.g., metal, where the material is coated with a plastic or rubber-like material. Rack 30 could be comprised of a metal wire that is coated, or non-coated if the material of the metal wire is rust-resistant. Thus, those in the art will understand that any suitable material, now known or hereafter developed, may be used in forming rack 30.

Each of loops 32a and 32b of rack 30 are arranged to rotatably engage container 20 (loop 32a is shown in FIGS. 1B and 7, and loop 32b is shown in FIG. 1B). First loop 32a is shown in FIG. 7 pivotally engaged about first protrusion 26a extending from outer wall 22 of container 20 and second loop 32b is shown in FIG. 1B pivotally engaged about second protrusion 26b extending from outer wall 22 of container 20. Loops 32a and 32b have center points CP1 and CP2, respectively (as shown in FIG. 8). It should be noted that protrusions 26a and 26b may substantially share center points CP1 and CP2, respectively. Center points CP1 and CP2 define rotational axis RX, about which rack 30 rotates, i.e., rack 30 rotates about an axis of rotation defined by center points 26a and 26b.

As generally depicted in FIG. 8, when rack 30 is rotated in first rotational direction RD1 about rotational axis RX (i.e., from the expanded position in FIGS. 1A and 1B to the collapsed position in FIG. 2), first longitudinal member 30b will abut/frictionally contact fifth protrusion 26e before resting in the collapsed position shown in FIG. 2. In order to secure rack 30 at least partially within container 30 (i.e., in the collapsed position shown in FIGS. 2 and 3), force must be imparted in rotational direction RD1 to allow longitudinal member 30b to pass by, or over, fifth protrusion 26e, thereby frictionally "locking" rack 30 within the collapsed position. Force must also be imparted on rack 30 in order for first longitudinal member 30b to be rotated in second rotational direction RD2 (i.e., from the collapsed position in FIGS. 2 and 3 to the expanded position in FIGS. 1A and 1B), and past, or over, the contact of fifth protrusion 26e, to allow rack 30 to rest on third protrusion 26c and fourth protrusion 26d (shown in FIGS. 1A and 1B), i.e., to position rack in the expanded position.

Figure 9:
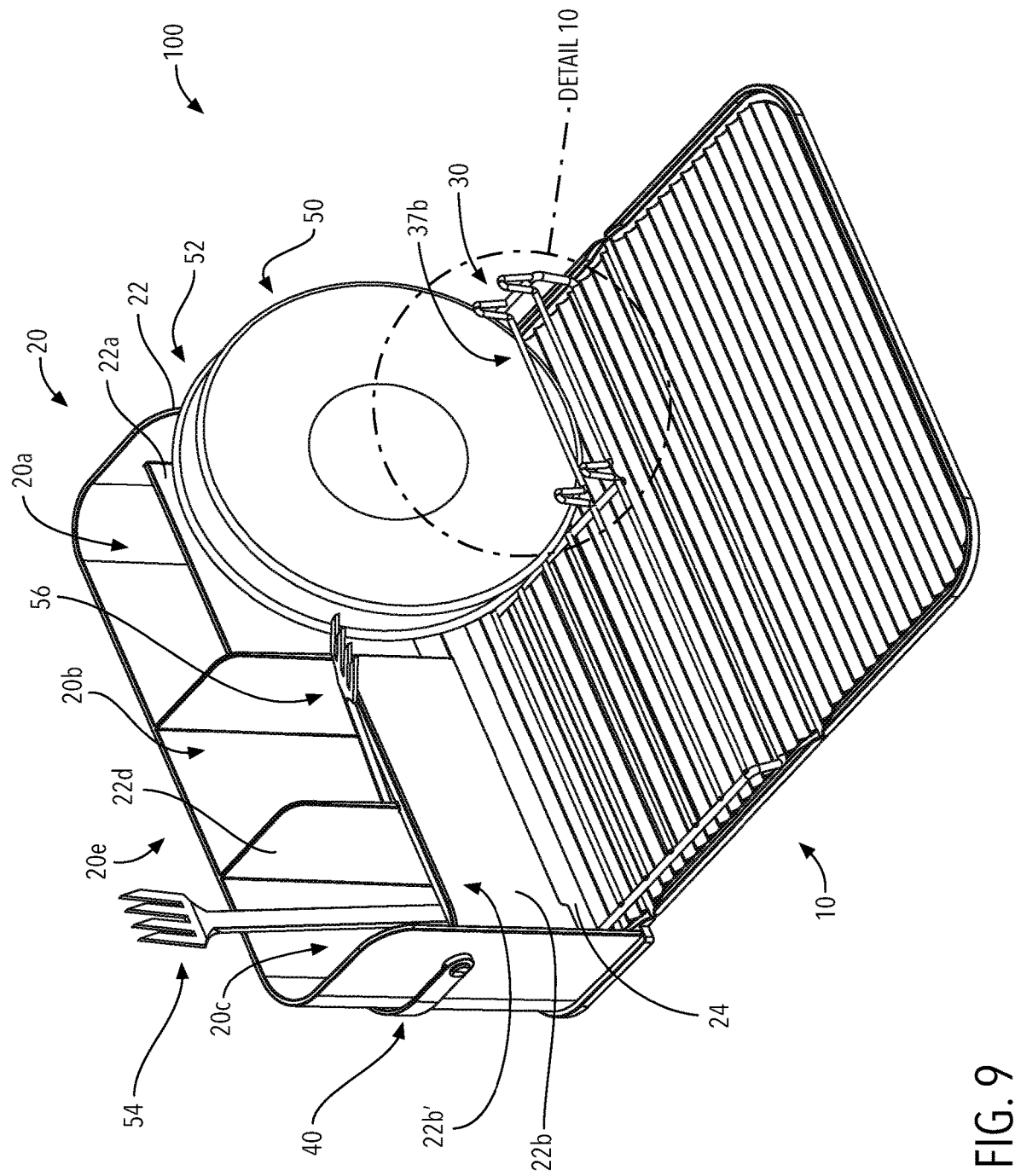
FIG. 9 is a perspective view of the invention shown in FIG. 1A in use.
Figure 10:
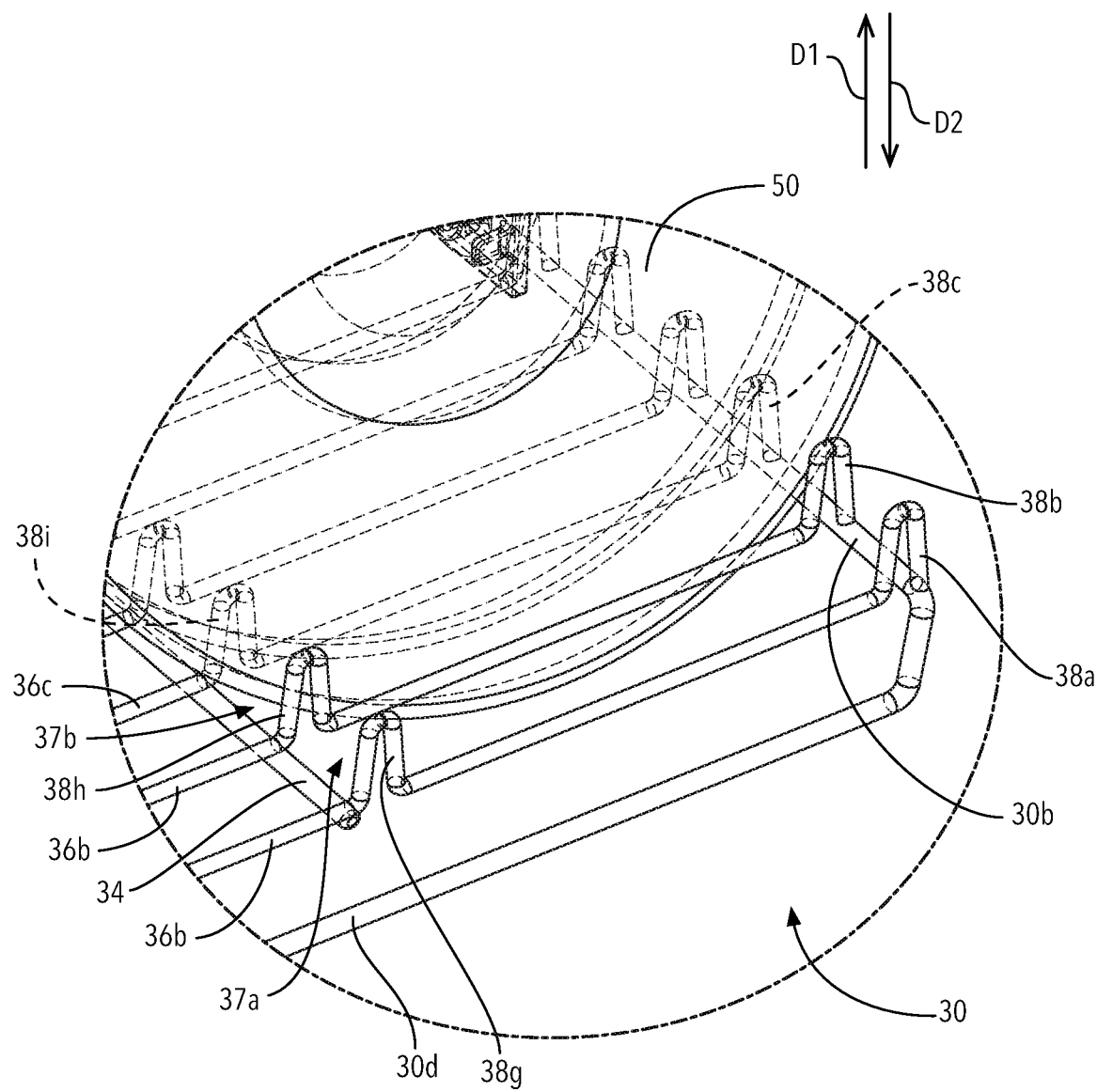
FIG. 10 is an enlarged skeleton view taken generally from DETAIL 10 in FIG. 9.

FIG. 9 generally illustrates a perspective view of combination assembly 100 in use and FIG. 10 shows an enlarged view taken generally from DETAIL 10 in FIG. 9 without mat 10. When combination assembly 100 is in an expanded position, utensils 54 and 56 (e.g., cutlery, or other kitchen implements) can be stored for drying within any of internal containers 20a through 20c. When rack 30 is in an expanded position, the first plurality of slots (e.g., slots 37a-37e shown in FIG. 8) and the second plurality of slots (e.g., slots 39a-39e shown in FIG. 8), provide positions for crockeries (e.g., dishes such as plates, bowls, and/or cups) to be stored in a generally upright position for drying, for example, plates 50 and 52 are each shown resting within one slot of the first plurality of slots (See FIG. 8) and specifically, plate 50 is resting within slot 37b. A respective pair of the protruding bends (See FIG. 8) provides an abutment to keep plates 50 and 52 in a substantially upright position when resting within a respective slot. As shown in FIG. 10, plate 50 is resting within slot 37a of rack 30 and is abutting protruding bends 38i and 38c. In some arrangements, plate 50 may abut at least one of protruding bends 38i and 38c, cross member 34, transverse member 36, and longitudinal member 30b.

As generally shown in FIG. 9, excess liquid may fall or drip from plates 50 and 52 onto mat 10 below. Additionally, band 40 can be rotated in a direction towards rack 30 and can be used to secure a kitchen utensil or implement against one of first partition 22a and second partition 22b while the utensil or implement rest on floor 24. In some embodiments, second partition 22b includes angled portion 22b' (also shown in FIG. 5) extending therefrom—allowing utensil 56 to rest thereon and a portion thereof to be hanging over mat 10 while the remaining portion of utensil 56 rests within internal compartment 20b.

As such, the embodiments shown and described are merely exemplary and various alternatives, combinations, omissions, of specific components, or foreseeable alternative components, understood by one having ordinary skill in the art, described in the present disclosure or within the field of the present disclosure, are intended to fall within the scope of the appending claims.

It will be appreciated that various aspects of the invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the claims.

REFERENCE NUMBERS

10 Mat
10a First seam
10b Second seam
10c Drying portion
10d Attachment portion
12 Plurality of ridges
14a Bottom surface
14b Top surface
16 Attachment wall
16a Lip
16b Outer surface
16c Inner surface
16d Space
20 Container
20a First internal compartment
20b Second internal compartment
20c Third internal compartment
20d Open end
20e Closed end
22 Outer wall
22a First partition
22b Second partition
22b' Angled portion
22c Third partition
22d Fourth partition
22e Notch
22f First slot
22g Second slot
24 Floor
24a Floor wall
24b Attachment fin
24c Attachment fin
24d Attachment fin
24e Attachment fin
24f Attachment fin
24g Attachment fin
26a First protrusion
26b Second protrusion
26c Third protrusion
26d Fourth protrusion
26e Fifth protrusion
28a First space
28b Second space
30 Rack
30a U-shaped frame
30b First longitudinal member
30c Second longitudinal member 30d Cross member
32a First loop
32b Second loop
34 Connecting member
36 Plurality of transverse members
36a First transverse member
36b Second transverse member
36c Third transverse member
36d Fourth transverse member
36e Fifth transverse member
36f Sixth transverse member
37a First slot
37b Second slot
37c Third slot
37d Fourth slot
37e Fifth slot
38 Plurality of protruding bends
38a First protruding bend
38b Second protruding bend
38c Third protruding bend
38d Fourth protruding bend
38e Fifth protruding bend
38f Sixth protruding bend
38g Seventh protruding bend
38h Eighth protruding bend
38 Ninth protruding bend
38j Tenth protruding bend
38k Eleventh protruding bend
38 Twelfth protruding bend
39a Sixth slot
39b Seventh slot
39c Eighth slot
39d Ninth slot
39e Tenth slot
40 Band
42a First outer protrusion
42b Second outer protrusion
50 Plate
52 Plate
54 Utensil
56 Utensil
100 Combination assembly
CP1 First center point
CP2 Second center point
D1 Direction
D2 Direction
FP Friction point
RX Rotational axis
RD1 First rotational direction
RD2 Second rotational direction

What is claimed is:

1. A combination drying mat, rack and storage container, comprising:
a mat having a raised attachment wall extending therefrom;
a container having an outer wall arranged to removably accept the raised attachment wall therein;
a flexible and expandable band pivotably attached to the container, wherein the band is arranged to pivot and substantially secure the rack in the second position;
a rack pivotably secured to the container and arranged to move between a first position wherein the rack is resting upon the mat and a second position wherein the rack is tucked at least partially into an area within the container, wherein the mat is arranged to move between a first position wherein the mat is extending away from the container and a second position wherein the mat is folded proximate the rack when the rack is in the first position of the rack.

2. The combination drying mat, rack and storage container recited in claim 1, wherein the container includes at least one internal compartment.

3. The combination drying mat, rack and storage container recited in claim 1, wherein the container includes at least one drainage aperture therein.

4. The combination drying mat, rack and storage container recited in claim 1, wherein the band is further arranged to pivot and substantially secure the mat in the second position of the mat.

5. A combination drying mat, rack and storage container, comprising:
a container having an outer wall;
a rack pivotably secured to the container and arranged to move between a first position wherein the rack is extending outwardly from the container and a second position wherein the rack is tucked at least partially into an area within the container, the rack having:
a substantially U-shaped attachment frame having a pair of longitudinal frame members, each longitudinal frame member having a loop at a first end and a cross frame member connected to the pair of longitudinal frame members at respective second ends of each longitudinal frame member; and,
a plurality of transverse members connected to the pair of longitudinal frame members, each of the plurality of transverse members spaced apart and forming slots therebetween, wherein the loops are arranged to pivotably engage a pair of protrusions extending from internal surfaces of the wall of the container; and,
a flexible and expandable band pivotably attached to the container, wherein the band is arranged to pivot and substantially secure the rack in the second position.

6. The combination drying mat, rack and storage container recited in claim 5 further comprising:
a mat having a raised attachment wall extending therefrom, wherein the outer wall of the container is arranged to arranged to removably accept the raised attachment wall therein.

7. The combination drying mat, rack and storage container recited in claim 6, wherein the mat is arranged to move between a first position wherein the mat is extending away from the container and a second position wherein the mat is folded proximate the rack when the rack is in the first position of the rack.

8. The combination drying mat, rack and storage container recited in claim 7, wherein the band is further arranged to pivot and substantially secure the mat in the second position of the mat.

9. The combination drying mat, rack and storage container recited in claim 8, wherein:
the container includes at least one internal compartment; and,
the container includes at least one drainage aperture arranged therein.

10. The combination drying mat, rack and storage container recited in claim 5, wherein at least one of the plurality of transverse members includes at least one pair of protrusions extending therefrom and arranged proximate one of the pair of longitudinal frame members, the at least one pair of protrusions being spaced apart.

11. The combination drying mat, rack and storage container recited in claim 10, wherein the wall of the container comprises:
a first sidewall;
a second sidewall;
a rear sidewall connected to and arranged between the first and second sidewalls;
at least one divider extending from the rear sidewall;
a first front divider extending from the first sidewall, the first divider connected to the at least one divider thereby forming a first internal compartment; and,
a second front divider extending from the second sidewall, the second divider connected to the at least one divider thereby forming a second internal compartment.

12. The combination drying mat, rack and storage container recited in claim 11, wherein the at least one pair of protrusions are arranged to be at least proximate the at least one divider when the rack is moved in the second position.

13. A combination drying mat, rack and storage container, comprising:
a mat having a raised attachment wall extending therefrom, the mat includes a plurality of ridges thereon and further includes a pair of seams, each of the pair of seams equally spaced apart;
a container having an outer wall arranged to removably accept the raised attachment wall therein;
a rack pivotably secured to the container and arranged to move between a first position wherein the rack is resting upon the mat and a second position wherein the rack is tucked at least partially into an area within the container; and,
a flexible and expandable band pivotably attached to the container, wherein the band is arranged to pivot and substantially secure the rack in the second position.

14. The combination drying mat, rack and storage container recited in claim 13, wherein the mat is arranged to move between a first position wherein the mat is extending away from the container and a second position wherein the mat is folded proximate the rack when the rack is in the first position of the rack.

15. The combination drying mat, rack and storage container recited in claim 14, wherein the band is further arranged to pivot and substantially secure the mat in the second position of the mat.

16. The combination drying mat, rack and storage container recited in claim 13, wherein:
the container includes at least one internal compartment; and,
the container includes at least one drainage aperture arranged therein.

17. A combination drying mat, rack and storage container, comprising:
a container having an outer wall having a locking protrusion extending from an inner surface of the outer wall;
a rack pivotably secured to a first protrusion and a second protrusion extending from the inner surface of the outer wall of the container, the rack arranged to rotate about the first and second protrusions between a first position wherein the rack is extending outwardly from the container such that it rests on at least one distal protrusion arranged below the locking protrusion and a second position wherein the rack is tucked at least partially into an area within the container in a vertical manner as compared to the first position and being frictionally locked within the second position by the locking protrusion; and
a mat arranged to removably connect to the container.

18. The combination drying mat, rack and storage container recited in claim 17 wherein:
the mat has a raised attachment wall extending therefrom, the mat includes a plurality of ridges thereon and further includes a pair of seams, each of the pair of seams equally spaced apart; and,
the outer wall of the container adapted to removably accept the raised attachment wall therein, thereby removably connecting the container to the mat.

19. The combination drying mat, rack and storage container recited in claim 17, wherein the at least one distal protrusion comprises a first distal protrusion and a second distal protrusion, each of the distal protrusions being arranged on opposite sides of the inner surface of the outer wall of the container, each of the distal protrusions being arranged below the first and second protrusions, wherein both of the distal protrusions are adapted to limit rotation of the rack in the first position.

20. The combination drying mat, rack and storage container recited in claim 17, wherein the container includes a floor connected to the outer wall, the floor having a floor wall extending distally therefrom, the floor wall being adapted to limit rotation of the rack in the second position.

21. The combination drying mat, rack and storage container recited in claim 17, wherein:
the at least one distal protrusion comprises a first distal protrusion and a second distal protrusion, each of the distal protrusions being arranged on opposite sides of the inner surface of the outer wall of the container, each of the distal protrusions being arranged below the first and second protrusions;
wherein the container includes a floor connected to the outer wall, the floor having a floor wall extending distally therefrom;
wherein both of the distal protrusions are adapted to limit rotation of the rack in the first position; and,
wherein the floor wall is adapted to limit rotation of the rack in the second position.

* * * * *